US009166928B2

(12) United States Patent
Lea

(10) Patent No.: US 9,166,928 B2
(45) Date of Patent: Oct. 20, 2015

(54) SCALABLE 3-STAGE CROSSBAR SWITCH

(71) Applicant: Chin Tau Lea, New Territories (HK)

(72) Inventor: Chin Tau Lea, New Territories (HK)

(73) Assignee: THE HONG KONG UNIVERSITY OF SCIENCE AND TECHNOLOGY, Kowloon (HK)

(*) Notice: Subject to any disclaimer, the term of this patent is extended or adjusted under 35 U.S.C. 154(b) by 103 days.

(21) Appl. No.: 13/629,195

(22) Filed: Sep. 27, 2012

(65) Prior Publication Data
US 2013/0083793 A1 Apr. 4, 2013

Related U.S. Application Data

(60) Provisional application No. 61/541,401, filed on Sep. 30, 2011.

(51) Int. Cl.
H04L 12/933 (2013.01)
H04L 12/931 (2013.01)
(Continued)

(52) U.S. Cl.
CPC ........ *H04L 49/1515* (2013.01); *H04L 49/1569* (2013.01); *H04L 49/1576* (2013.01); *H04L 49/25* (2013.01); *H04L 49/254* (2013.01); *H04L 49/506* (2013.01); *H04L 49/508* (2013.01);
(Continued)

(58) Field of Classification Search
CPC ... H04L 49/00; H04L 49/101; H04L 49/1507; H04L 49/1523; H04L 49/1569; H04L 49/1576; H04L 49/254; H04L 49/3018; H04L 49/3027; H04L 49/3045; H04L 49/3072; H04L 49/506; H04L 1/0083; H04L 45/24; H04L 49/508; H04L 49/1515; H04L 49/6027; H04L 49/25; H04Q 11/06; H04Q 2213/13393; H04Q 2213/1334; H04Q 2213/13341; H04Q 2213/13292; H04Q 2213/13076; H04Q 3/0004; H04Q 2011/0058; H04Q 2213/04; H04Q 2213/1304; H04Q 2203/0012–2203/0016; H04Q 3/68; H04J 2203/0012–2203/0016
USPC ......... 370/232, 235, 359, 385, 386, 388, 389, 370/412, 419, 421, 498, 369–379
See application file for complete search history.

(56) References Cited

U.S. PATENT DOCUMENTS 6,870,831 B2 * 3/2005 Hughes et al. ................ 370/352
7,046,687 B1 * 5/2006 Brown et al. ................. 370/412
(Continued)

OTHER PUBLICATIONS

Kogge, "The Tops in Flops", IEEE Spectrum, 48(2), Feb. 2011, pp. 49-55, 6 pages.
(Continued)

Primary Examiner — Edan Orgad
Assistant Examiner — Ivan O Latorre
(74) Attorney, Agent, or Firm — Amin, Turocy & Watson, LLP

(57) ABSTRACT

Systems and methods are presented relating to a three stage crossbar based switching system and a scheduling method for transmission of data packets and associated request and grant tokens. The first stage and third stage portions of the switching system contain TDM crossbars, which are interconnected by a middle stage set of crossbars. In an embodiment, the system switching module is a m×m crossbar switch comprising m inputs and m outputs. The switch has a size $m^2 \times m^2$ formed from m×m crossbar modules. Scheduling of data packet servicing is on a frame by frame basis relating to selection based on port addresses and port address groups. Further, time slot interchange is utilized to address time slot mismatch.

18 Claims, 12 Drawing Sheets

(51) Int. Cl.
*H04Q 3/68* (2006.01)
*H04L 12/937* (2013.01)
*H04L 12/947* (2013.01)
*H04Q 11/06* (2006.01)
*H04L 12/707* (2013.01)

(52) U.S. Cl.
CPC .............. *H04Q 3/68* (2013.01); *H04Q 11/06* (2013.01); *H04L 45/24* (2013.01)

(56) References Cited

U.S. PATENT DOCUMENTS

| | | | |
|---|---|---|---|
| 7,113,505 B2* | 9/2006 | Williams | 370/370 |
| 7,149,996 B1 | 12/2006 | Lysaght et al. | |
| 7,212,524 B1* | 5/2007 | Sailor et al. | 370/370 |
| 7,486,669 B2* | 2/2009 | Brown | 370/388 |
| 8,165,145 B1* | 4/2012 | Sindhu et al. | 370/412 |
| 2002/0051446 A1* | 5/2002 | Klausmeier et al. | 370/386 |
| 2002/0085578 A1 | 7/2002 | Dell et al. | |
| 2003/0021266 A1* | 1/2003 | Oki et al. | 370/388 |
| 2003/0112831 A1* | 6/2003 | Williams | 370/535 |
| 2005/0207436 A1* | 9/2005 | Varma | 370/412 |
| 2006/0165070 A1* | 7/2006 | Hall et al. | 370/369 |
| 2006/0165112 A1* | 7/2006 | Varma | 370/428 |
| 2007/0053356 A1* | 3/2007 | Konda | 370/390 |
| 2007/0280261 A1* | 12/2007 | Szymanski | 370/395.4 |
| 2008/0212472 A1* | 9/2008 | Musacchio et al. | 370/232 |
| 2008/0267204 A1* | 10/2008 | Hall et al. | 370/412 |
| 2011/0026539 A1* | 2/2011 | Rojas-Cessa et al. | 370/412 |
| 2011/0292932 A1* | 12/2011 | Nichols et al. | 370/376 |
| 2012/0243868 A1* | 9/2012 | Meyer et al. | 398/46 |

OTHER PUBLICATIONS

"The Essential Core: Juniper Networks T640 Internet Routing Node with Matrix Technology". Copyright (c)2002, Juniper Networks, Inc. 12 pages.

Thompson, "The Dilated Slipped Banyan Switching Network Architecture for Use in an All-Optical Local-Area Network". Journal of Lightwave Technology, vol. 9, No. 12, Dec. 1991, 8 pages.

Chang, et al., "Load Balanced Birkhoff-von Neumann Switches, Part I: One-stage Buffering", 25 pages.

Keslassy, et al., "Scaling Internet Routers Using Optics". DIGCOMM'03, Aug. 25-29, 2003. Copyright 2003 ACM 1-58113-735-4/03/0008, 12 pages.

Lin, et al., "Frame-Aggregated Concurrent Matching Switch". ANCS'07, Dec. 3-4, 2007. Copyright 2007 ACM 978-1-59593-945-6/07/0012, 9 pages.

Chang, et al., "Mailbox Switch: A Scalable Two-stage Switch Architecture for Conflict Resolution of Ordered Packets", 0-7803-8355-9/04$20.00 (c)2004 IEEE, 12 pages.

Shen, et al., "Byte-Focal: A Practical Load Balanced Switch", 0-7803-8924-7/05/$20.00 (c)2005 IEEE, 7 pages.

McKeown, "The iSLIP Scheduling Algorithm for Input-Queued Switches", IEEE/ACM Transactions on Networking, vol. 7, No. 2, Apr. 1999, 14 pages.

Tamir, et al., "High-Performance Multi-queue Buffers for VLSI Communication Switches". CH2545-2/88/0000/0343$01.00 (c)1988 IEEE, 12 pages.

"Cisco Carrier Routing System". http://www.cisco.com/en/US/products/ps5763/index.html. Last accessed Sep. 18, 2012, 2 pages.

Lamaire, et al., "Two-Dimensional Round-Robin Schedulers for Packet Switches with Multiple Input Queues", IEEE/ACM Transactions on Networking, vol. 2, No. 5, Oct. 1994, 12 pages.

Hopcroft, et al., "Algorithm for Maximum Matchings in Bipartite Graphs", 1973, 4 pages.

Giaccone, et al., "Randomized Scheduling Algorithms for High-Aggregate Bandwidth Switches", IEEE Journal on selected areas in communications, vol. 21, No. 4, May 2003, 14 pages.

* cited by examiner

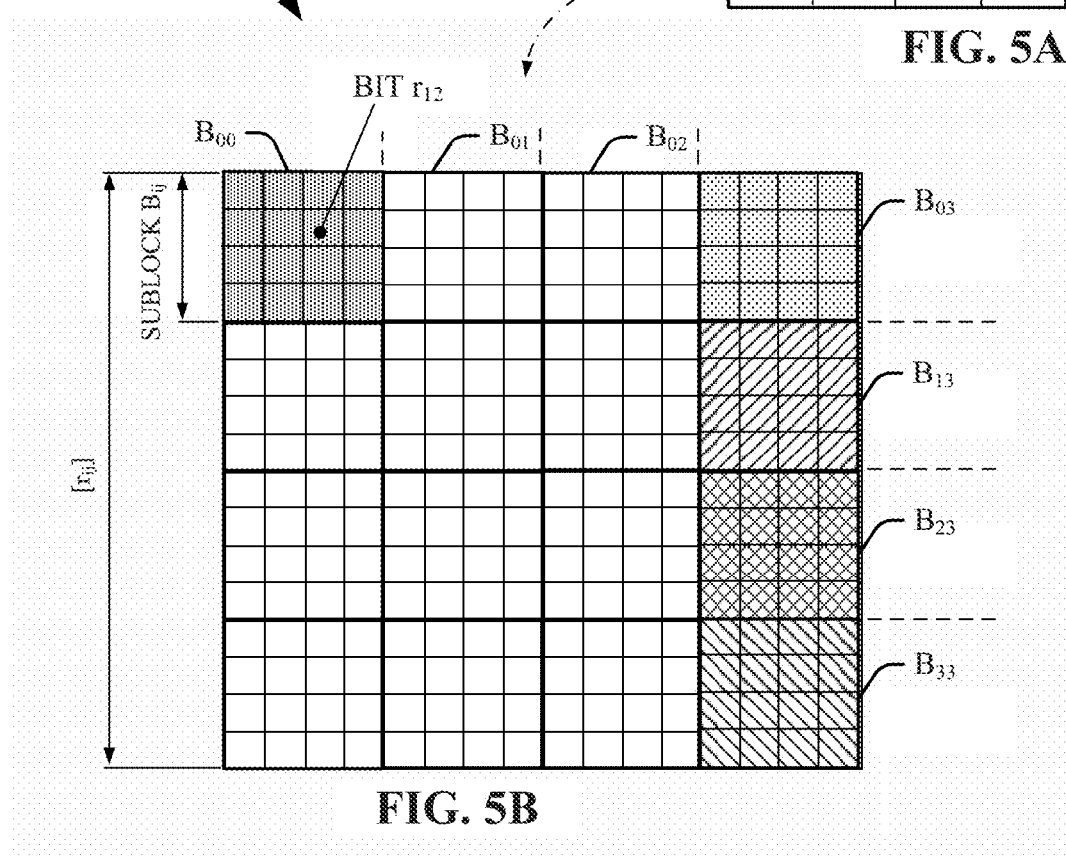
FIG. 5A
FIG. 5B
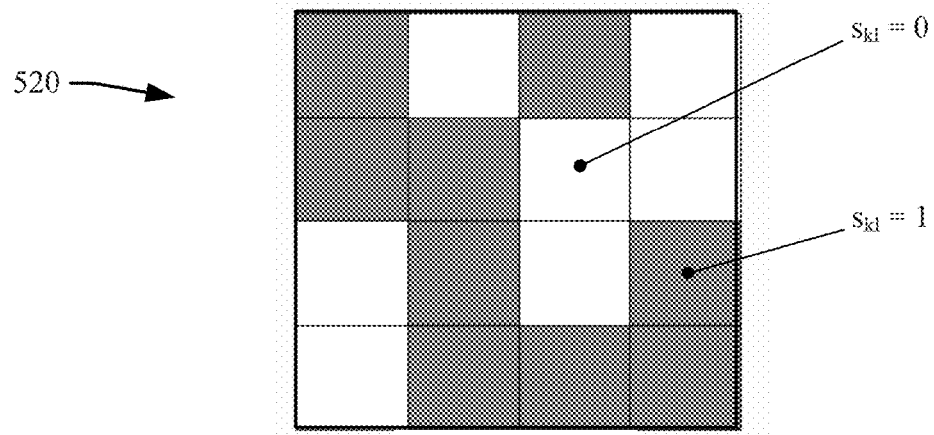
FIG. 5C

SCALABLE 3-STAGE CROSSBAR SWITCH

RELATED APPLICATIONS

This patent application claims priority to U.S. Provisional Patent Application No. 61/541,401, filed on Sep. 30, 2011, entitled "PGM: A SCALABLE 3-STAGE CROSSBAR SWITCH", the entirety of which is incorporated herein by reference.

TECHNICAL FIELD

The subject specification relates generally to communication systems and methods, and in particular, a scalable crossbar-based switching system and associated architecture.

BACKGROUND

A communication router is typically comprised of two parts: a modular electronic circuit such as a line card(s) and an interconnecting architecture such as a switch fabric, where the switch fabric provides the interconnecting function for a plurality of line cards. Further, to facilitate data communication across a router, a variable length data packet(s) is often divided into fixed-length cells in a line card prior to forwarding to a switch, and ultimately on to a device associated with the switch, e.g., a memory device or other component.

FIGS. 13 and 14 illustrate conventional single-switch architectures, with FIG. 13 illustrating system 1300 comprising a shared memory switch and FIG. 14 illustrating system 1400 comprising a crossbar-based switch. As illustrated, a plurality of line cards (e.g., FIG. 13, line cards 1310A-Y, and FIG. 14, line cards 1410A-Y, where A-Y are positive integers) are associated with a respective port processor on each line card (e.g., FIG. 13, port processors 1330A-Y, and FIG. 14, port processors 1430A-Y).

As illustrated in FIG. 13, in a shared memory switch, the port processor 1330 on line card 1310 writes data packet(s) 1355 into, and reads data packet(s) 1355 from, memory 1350, where memory 1350 is shared by all the port processors 1330 via lines 1340 (e.g., a serial link) comprising the switch architecture 1300. A problem with a switch architecture of this nature is that memory 1350 must operate at a speed M times the link rate to satisfy the demand(s) placed on memory 1350 by any or all of line cards 1310 and/or port processors 1330, where M is the number of input (output) ports of the switch. As the required M increases (e.g., more line cards 1310 added), constructing memory 1350 becomes costly. Further, the power consumption of moving data packets in and out of a shared memory switch is also high.

A crossbar-based switch system 1400, as illustrated in FIG. 14, comprises a plurality of line cards 1410A-Y and respective port processors 1430A-Y connected to a crossbar switch 1450 and a scheduler 1460, with multiple m×m (m inputs and m outputs) data lines 1470 (heavy line) running in parallel, and control lines 1480 (narrow line) running in parallel. Data packets 1455 are transmitted between port processors 1430 to crossbar switch 1450 via data lines 1470 (paths 1470 are typically called the 'data path'), and control packets are exchanged between port processors 1430 and scheduler 1460 (paths 1480 are typically called the 'control path'), where request(s) 1490 received at, and grant(s) 1495 generated by, scheduler 1460 are utilized to control transmission of respective data packets 1455 across any of data paths 1470. Typically, the bandwidth requirement for a data path 1470 will be much greater than for a control path 1480. With a crossbar-based switch, when a data packet arrives at a line card 1410 for transport by crossbar switch 1450, a request token 1490 is sent to scheduler 1460 by a port processor 1430. A request 1490 by a particular output port processor (e.g., any of 1430) is recorded in a counter inside scheduler 1460. Once scheduling is determined, scheduler 1460 returns a grant token 1495 to the requesting port processors, via the control path. Upon receipt of a grant token 1495, a port processor 1430 transmits a data packet(s) 1455 corresponding to a destination in crossbar switch 1450 defined in the received grant token 1495. In general, with a crossbar switch system data packet(s) 1455 will be moved in and out of the port processor 1430 at a speed comparable to the link rate supportable on data lines 1470. In contrast, a shared memory switch (as illustrated in FIG. 13) has to move data in and out of port processor 1330 at a speed M times the link rate. Typically, crossbar switches 1450 do not buffer data packets and comprise minimal logic. Hence, a crossbar switch consumes significantly less power than a shared memory switch.

However, single-stage switches have a scalability problem. Every line card in a single-stage switch architecture requires at least one high-speed link terminating on a shared memory chip or a crossbar chip (or the scheduler chip), but the number of high-speed serial links is limited by available technology.

In response to the scalability problem 3-stage switches have been proposed as a possible solution. FIG. 3 illustrates a switch using a three-stage Benes-Clos topology. Adoption of Benes topology in 3-stage switches enables the construction of an m²×m² (m² input ports and m² output ports) switch out of single-stage switch modules of size m×m. Conventionally, crossbar-based architectures have limited, if any, application in 3-stage switches because there is no simple way to design a scheduler able to control traffic over the respective crossbar switches. Commercial 3-stage products, such as routers provided by JUNIPER and CISCO, are all based on a shared memory architecture (e.g., a buffered network). However, a buffered approach can lead to out-of-sequence transmissions over a 3-stage switching fabric because there are m (m=$N^{1/2}$) paths in the switch and data packets are randomly routed through these paths. Attempting to re-sequence packets at 40- or even 100-Gbps can be a substantial task. To overcome the random routing of data packets a large amount of memory for data packet re-sequencing is required. Furthermore, a buffered architecture also has a problem with high-power consumption and is not compatible with optical switching technologies, where such optical switching technologies are un-buffered in nature.

Some multiple-stage crossbar switches have been proposed to address the foregoing issues. In one instance, an optical banyan network has been proposed as a packet switch for local area networks (LANs). Since a banyan network is non-blocking for a round-robin (RR) connection pattern, a time division multiplexing (TDM) banyan network can be utilized, where each input is connected to all outputs in a round robin manner. While a scheduler component is not required for such a TDM banyan network, a problem with this approach is that a TDM crossbar has poor performance unless traffic is uniformly distributed among the outputs, which is generally not the case in a packet network. Further a cascade approach comprising two TDM crossbars, with virtual output queue (VOQ) buffers inserted therebetween, has been proposed in the load-balanced switch. The first TDM crossbar evenly distributes packets to its output ports and creates a uniform traffic pattern for the second TDM crossbar. The cascade approach addresses a problem with an assumption of invalid uniform traffic. However, the cascade approach creates out-of-sequence transmissions in a similar manner to that of a buffered multi-stage switch. Hence, packet re-sequencing at the speed of 100-Gbps may be as challenging as designing the scheduler for a large switch.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The various exemplary, non-limiting embodiments presented herein relate to a three stage crossbar based switching system and a scheduling method for transmission of data packets and associated request and grant tokens. The switching system comprises a plurality of line cards and associated port processors, at least one scheduler and a switch fabric comprising respective first, second (middle) and third stages with each stage comprising at least one switch. The first stage and third stage portions of the switching system contain TDM crossbars, which are interconnected by a middle stage set of crossbars. In an exemplary, non-limiting embodiment, the fundamental switching module of the system is an m×m crossbar switch (where the crossbar switch comprises m inputs and m outputs). Hence, in a further exemplary, non-limiting embodiment the various aspects presented herein facilitate construction of a switch with the size $m^2 \times m^2$ out of the basic m×m crossbar modules while achieving very high data packet throughput (in the order of 100%).

A further exemplary, non-limiting embodiment relates to design of a scheduler for the three stage crossbar based switching system. In an aspect, scheduling of data packet servicing is performed in a frame by frame basis. In a further exemplary, non-limiting embodiment for any given slot in a frame, the scheduling consists of two phases. During the first phase, matching is performed between groups of input ports (ports are divided into m groups and m ports in each group) and groups of output ports. As presented herein, the various embodiments enable construction of a scheduler having much lower complexity than that of a conventional scheduler constructed to perform port scheduling. During the second phase, the port address of each port group is selected. Both the first phase and the second phase are performed by a scheduler associated with the second stage switches.

A further exemplary, non-limiting embodiment relates to design of the crossbar system. A TSI (time slot interchange) of m memory slots (m is the frame size) is added to each input link of the crossbar. Utilizing a TSI prevents potential problems regarding time slot mismatch created during the group matching performed by a scheduler of the second stage.

BRIEF DESCRIPTION OF THE DRAWINGS

FIG. 5A is a block diagram illustrating an exemplary, non-limiting embodiment of a Port request matrix $[r_{ij}]$ and block $B_{ij}$, which color cells represent 1, blank cells 0.

FIG. 5B is a block diagram illustrating an exemplary, non-limiting embodiment of a Port request matrix $[r_{ij}]$ and block $B_{ij}$, which color cells represent 1, blank cells 0.

FIG. 5C is a block diagram illustrating an exemplary, non-limiting embodiment of a Group request matrix $[s_{ij}]$, which colored cells represent 1, blank cells 0.

DETAILED DESCRIPTION

Parallel Group Matching (PGM) Switch Architecture

Figure 1:
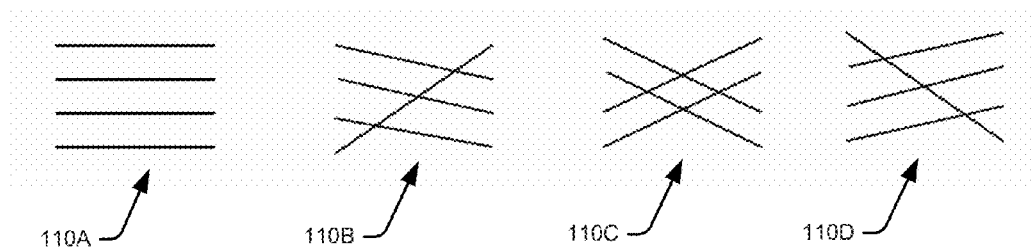
FIG. 1 is a block diagram illustrating exemplary, non-limiting embodiments of a 4×4 TDM crossbar.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

The subject innovation presents various systems and methods relating to a switching system that while being scalable, also addresses issues relating to simple scheduler design, out of sequence transmissions, etc., encountered with conventional approaches as described in the Background. By utilizing a switch comprising a first stage set of crossbar switches, a third stage set of crossbar switches, and a second stage set of crossbar switches with schedulers a system fabric topology can be designed to facilitate highly efficient transmission and receipt of requests and grants for data packet transfer, and thus a corresponding efficiency in transfer of data packets. By utilizing a simple approach to facilitate determination, by a scheduler, of a data path to be utilized to transfer a data packet, a data path can be readily identified, the data packet transferred with minimal impact on decision making regarding defining a transmission path for a subsequent data packet to use.

As previously mentioned, an incoming data packet can be subdivided ('chopped') into a plurality of data packets (or cells) having a fixed-length, where such subdivision can be performed prior to submission of the data packet to the switch fabric, e.g., by a line card port processor. The various exemplary, non-limiting embodiments presented herein operate in a 'cell mode' (i.e., all data packets being transmitted through the switch fabric have the same packet length), while the terms 'packet', 'data packet', and 'cell' are used interchangeably herein. By utilizing data packets of defined length, the data packets can be efficiently directed to a plurality of switches for final recombination at a third stage switch, as necessary.

It is to be appreciated that the terms 'second stage' and 'middle stage' are used interchangeably throughout to present elements relating to operation of crossbar switches, schedulers, counters, etc., (Mx-2, 310, 320, etc.) associated with switches operating in the second/middle stage of system to indicate components/operations being undertaken between the middle stage and either of the first stage or the second stage.

Figure 14:
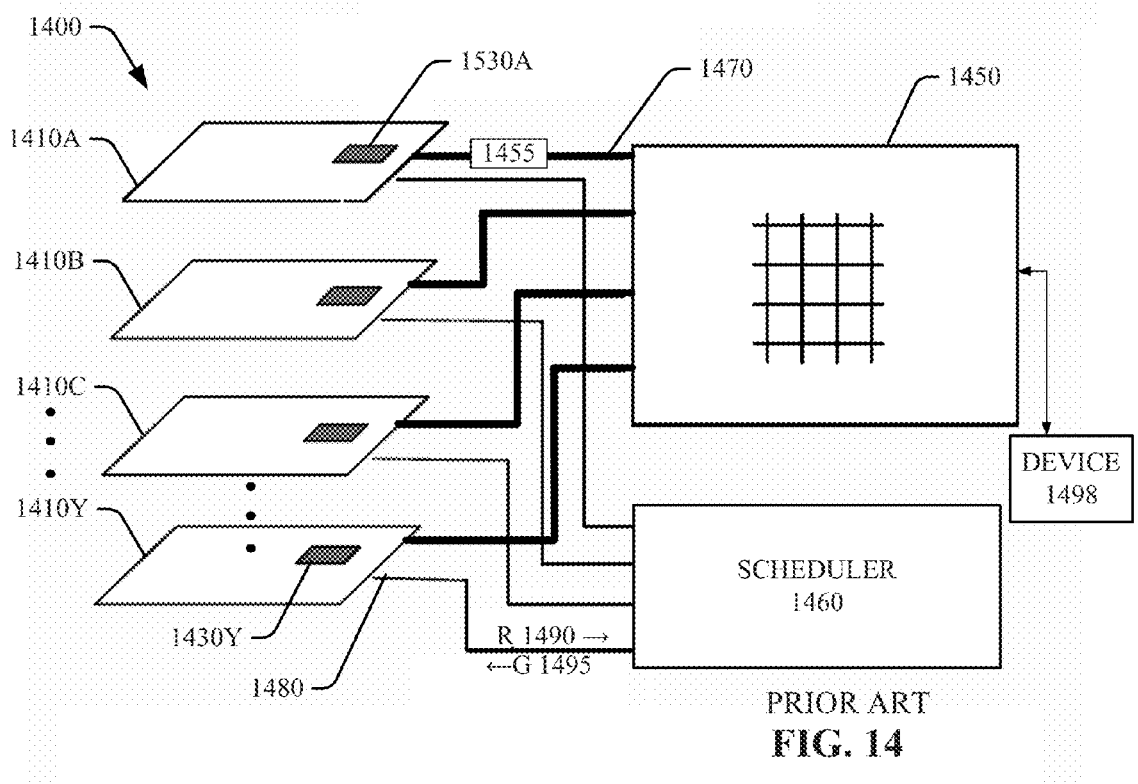
FIG. 14 is a block diagram illustrating a crossbar-based switch system.

Further, as previously mentioned with regard to operation of the crossbar-based switch illustrated in FIG. 14, port processors (e.g., 1430A-Y) act as the interface between respective line cards (e.g., 1410A-Y) and the switch fabric (e.g., 1450, 1460, 1480, and 1490). Port processors receive cells from line cards and send request tokens (e.g., 1490, essentially short control packets) to the scheduler (e.g., 1460). Grant tokens (e.g., 1495) are returned by the scheduler after scheduling is performed. As previously mentioned, scheduler 1460 and links 1480 utilized for transmission of request tokens 1490 and grant tokens 1495 are referred to as the 'control path', and the crossbars 1450 and links 1470 for transmitting data packets 1455 are called the 'data path'. Typically, the bandwidth of a control path is only a fraction that of a data path.

Returning to FIG. 15, the illustrated traffic pattern at switch 1500 comprises of traffic at an input port being evenly spread amongst all the output ports, as indicated by traffic (e.g., 0.15a, 0.15b, 0.15c, and 0.15d) at the third input port 1530, which means that 15% of traffic goes to output a, b, c, and d respectively. Thus traffic is equally distributed amongst the output ports 1540A-D, the so called 'o_uniform' pattern. For such traffic pattern as shown in system 1500, round-robin scheduling can be utilized as an input port (e.g., 1530) will be connected to all output ports (e.g., 1540A-D) with the same level of preference across all of the output ports. This approach results in the provision of a time division multiplexing (TDM) crossbar with a round robin connection pattern. This TDM crossbar does not require a scheduler component.

FIG. 1 illustrates an exemplary, non-limiting embodiments of a 4×4 TDM crossbar (e.g., any of configurations 110A-D) of which the interconnection pattern of each slot can be described as shown in equation 1:

$$\text{Input} \quad \text{Output} \qquad (1)$$
$$i \rightarrow (i+k) \bmod m$$

where m is the TDM frame size and k, where k=(0≤k≤m−1), is the slot number within a frame (e.g., for a frame size of m=4, then k=0-3).

Figure 2:
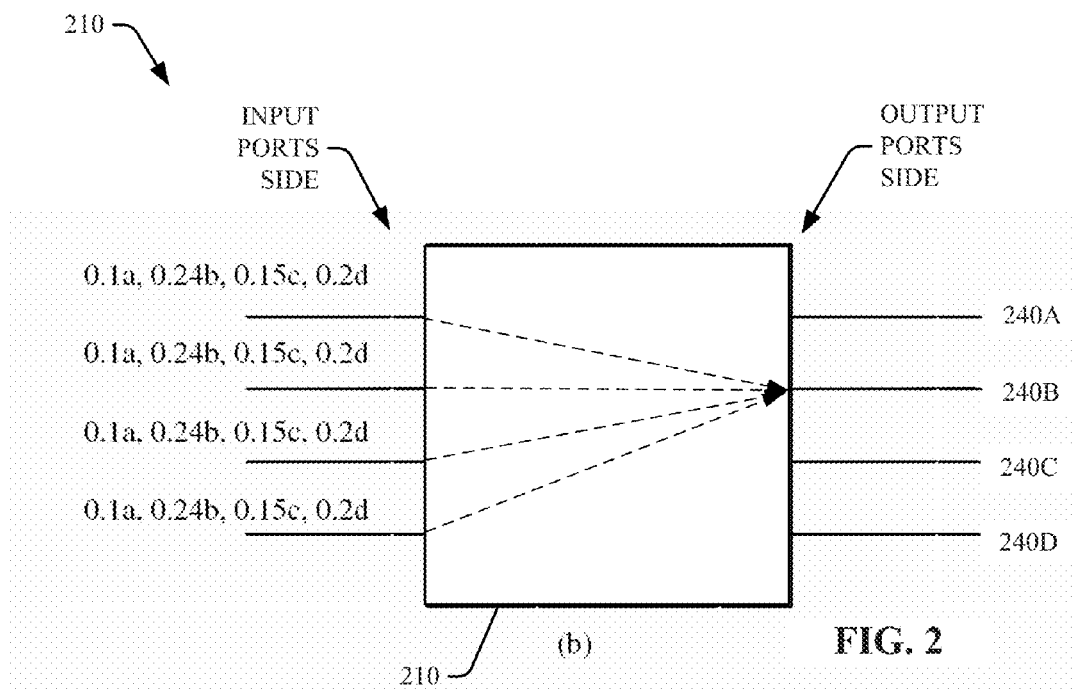
FIG. 2 is a block diagram illustrating an exemplary, non-limiting embodiment an i_uniform traffic pattern: Traffic arriving at an output port comes evenly from all input ports.
Figure 15:
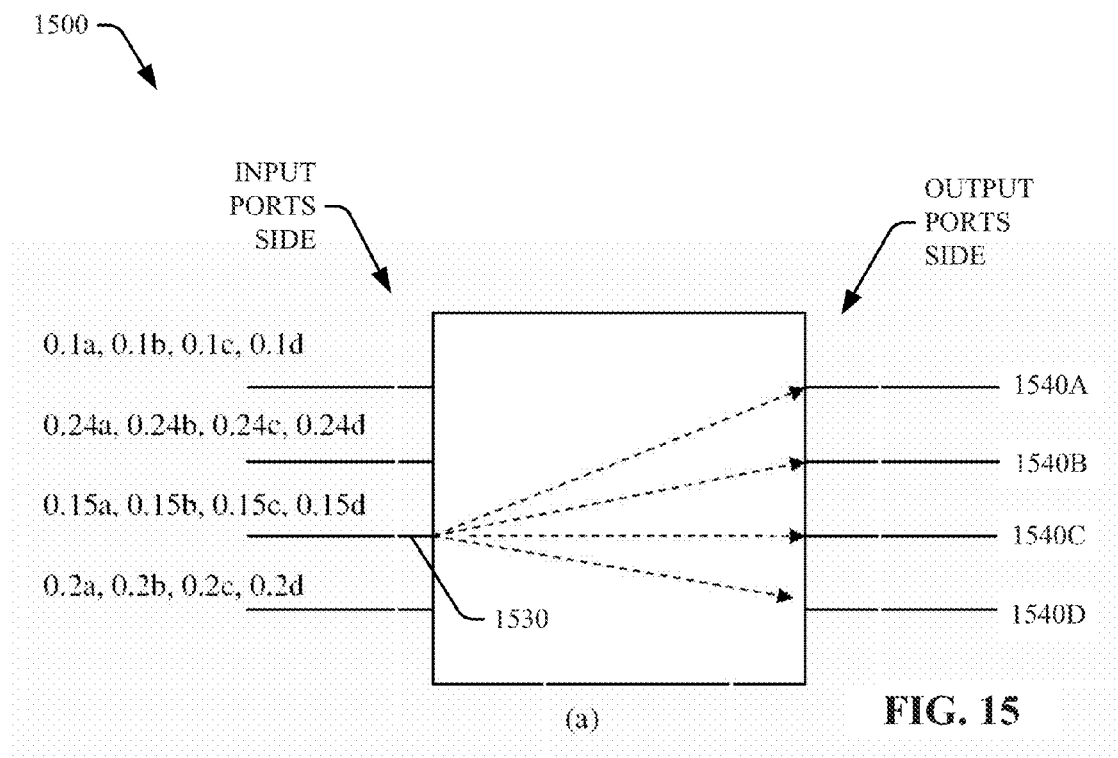
FIG. 15 is a block diagram illustrating an o_uniform traffic pattern.

However, as illustrated in the exemplary, non-limiting embodiment presented in FIG. 2, a different form of uniform traffic flow can be configured in comparison with the conventional o_uniform approach illustrated in FIG. 15. FIG. 2 illustrates a switch 210 where all input ports have identical traffic patterns. In FIG. 2, the four outputs are a, b, c, d, and the load on each link is the same: 0.1a, 0.24b, 0.15c, 0.2d—indicating 10% of all traffic goes to output a, 24% goes to output b, 15% goes to output c, and 20% goes to output d. From an output port's perspective, (e.g., any of output ports 240A-D) all of the traffic being subsequently forwarded by an output port is uniformly distributed among all input ports. To provide distinction between the respective approaches depicted in FIGS. 2 and 15, the conventional uniform traffic pattern illustrated in FIG. 15 as previously mentioned is termed herein o_uniform, indicating the traffic is uniformly spread to the outputs ports. While the pattern illustrated in FIG. 2 is termed herein 'i_uniform' indicating traffic destined for an output is uniformly spread among all input ports. An i_uniform traffic pattern also means that A TDM crossbar can also be utilized where traffic is i_uniform. Hence, a switch circuit can be constructed comprising TDM crossbar switches in situations where 'i_uniform' and 'o_uniform' circumstances exist, as described further herein.

Figure 3:
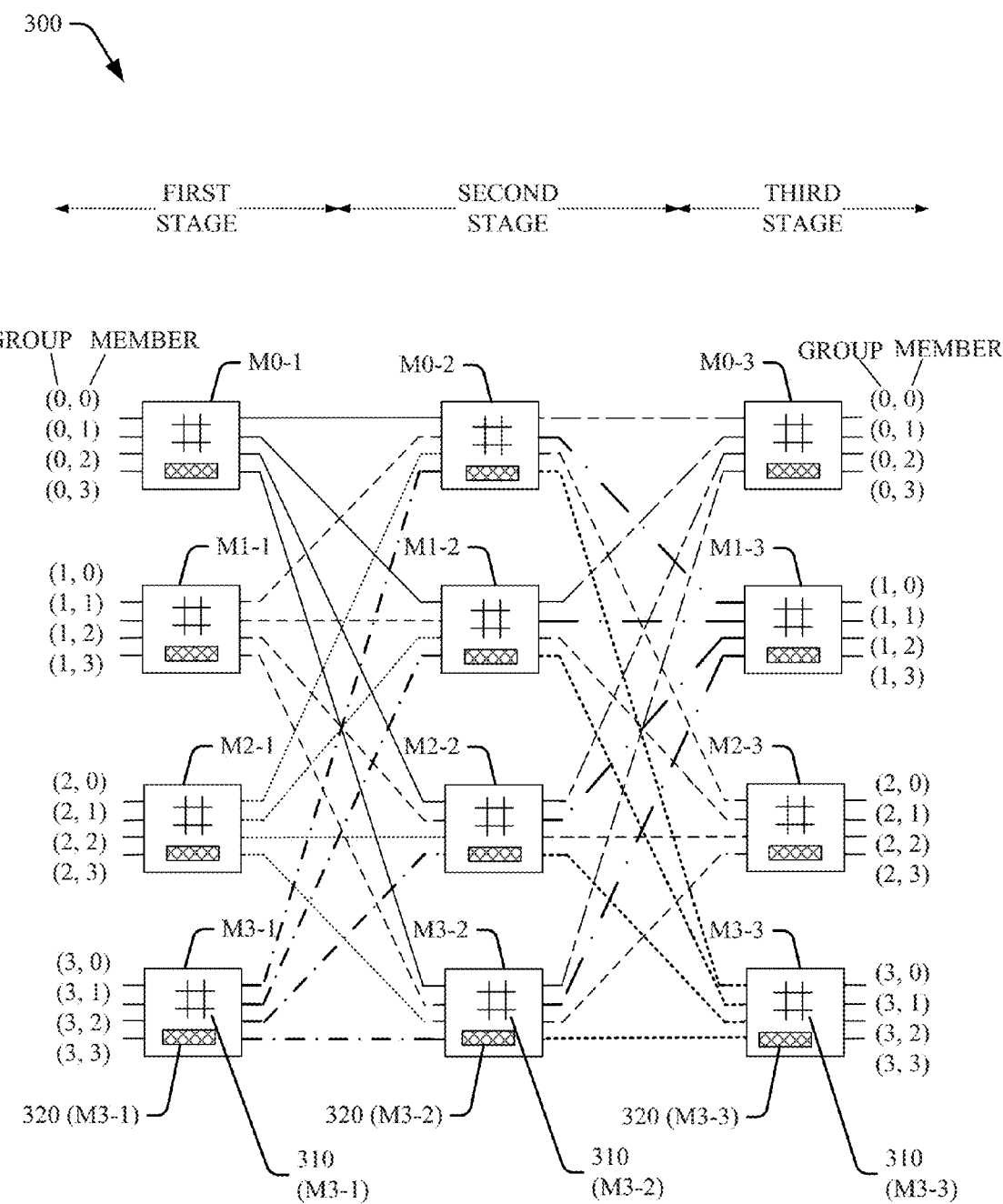
FIG. 3 is a block diagram illustrating an exemplary, non-limiting embodiment of a three-stage switch. The input and output patterns of any two middle stage crossbars are link-by-link identical. Links marked with the same label have the same traffic pattern.

FIG. 3 illustrates an exemplary, non-limiting embodiment of a three-stage switch system 300 comprising a topology commonly referred to as Benes-Clos topology, where link connectors marked with the same linestyle have the same traffic pattern. System 300 comprises m crossbar switches 310 of the size (m×m) in each stage, with the entire switch having a size m²×m². Each crossbar is numbered from 0 to m−1 and linkports of a crossbar are also numbered from 0 to m−1. Hence, in the illustration crossbar switch M0-1 has the identifier M0 and resides in the first stage as indicated by the suffix-1 to form an identifier M0-1. A scheduler 320 is associated with each crossbar 310 in each crossbar switch. It is to be appreciated that for simplicity of illustration only crossbars 310 and schedulers 320 are labeled on FIG. 3, however, as shown, a scheduler and crossbar is associated with each crossbar switch.

Figure 16:
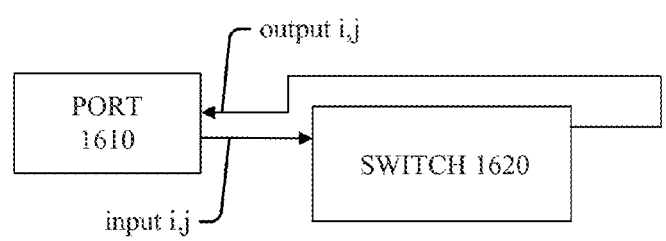
FIG. 16 is an exemplary, non-limiting embodiment illustrating port nomenclature for a switch and a port.

In the exemplary, non-limiting embodiment, each link, input link and/or output link, is specified by a two-tuple address: (group, member). The 'group' address is the number or address of the crossbar to which the link is attached, and the 'member' address is the link address within the crossbar. It is to be noted that the input link (i,j) and output link (i,j) are connected to the same port, where each port has one input link going into a switch and one output link coming from the switch so that it can send traffic to other ports (as illustrated in FIG. 16, port 1610 and switch 1620).

Operation of a first stage crossbar (e.g., any of Mx-1) and a third stage crossbar (e.g., any of Mx-3) in system 300 can be defined with reference to FIGS. 2 and 15 according to the following properties and proofs:

Property 1: In a three stage Benes-Clos network, the traffic pattern of a first stage crossbar switch can be treated as o_uniform.

Proof 1: The function of a first stage crossbar (e.g., any of the switches Mx-1 in the vertical column under 'First Stage') illustrated in FIG. 3 is to distribute traffic evenly to middle-stage crossbars (e.g., any of the switches Mx-2 in the vertical column under 'Second Stage').

Property 2: In a three stage Benes-Clos network, the traffic pattern of a third stage crossbar switch can be treated as i_uniform.

Proof 2: The input patterns of any two switches A and B are said to be 'link-by-link identical' if the i-th input link of switch A carries the same traffic pattern as the i-th input (or output) link of switch B. The same definition can also be used for describing the output traffic patterns of a pair of switches. As shown with reference to FIG. 3, the function of a first-stage switch (e.g., M0-1) is distributing traffic equally to each of the second stage switches (e.g., equally amongst M0-2, M1-2, M2-2, and M3-2) as indicated by the unbroken linkage line. The traffic patterns of its output links are identical. These output links are distributed to middle stage switches at the same location. Thus the input traffic patterns of any two middle stage switches are link-by-link identical. All schedulers of the second stage use the same scheduling algorithm. Thus the output traffic patterns of any two middle stage switches are also link-by-link identical. By the connection pattern of the switch, this implies that all input links of any third stage switch have identical traffic pattern. By definition, this means that the traffic pattern of a third-stage switch is i_uniform.

Therefore, both the first-stage switches (e.g., Mx-1) and the third-stage switches (e.g., Mx-3) of system 300 can be implemented with TDM crossbars (with a frame size=m). The first-stage and the third-stage TDM crossbars are interconnected with the middle-stage crossbars, where a scheduling function matches requests between port groups (e.g., with each crossbar in the first stage or the third stage representing a port group), as opposed to requests solely between ports. Further the group matching is performed by all of the schedulers comprising middle-stage switches (e.g., respective schedulers 320 associated with each of Mx-2) operating in parallel. The operation of switch matching by group in a parallel fashion is termed herein a parallel group matching (PGM) switch.

It is to be appreciated that the PGM switch depicted in FIG. 3 has $m^2$ ports but only m port groups. For example, 4 input switches (e.g., M0-1, M1-1, M2-1 and M3-1) with a total of 16 input links or 4 output switches (e.g., M0-3, M1-3, M2-3 and M3-3) with a total of 16 output links. In another aspect, the group size does not have to be m. For example, for a 16×16 switch, a group size=4 can be selected, and has a corresponding member address between 0-3. However, it is also possible to select a group size of 8, resulting in two groups, each with a member address of 0-7. Hence, the various embodiments presented herein are not restricted to a group size of m, but other group sizes are equally applicable. Accordingly, by virtue of operation of a PGM switch, the complexity of the matching algorithm in a PGM switch is much less than the complexity of the matching algorithm for a single-stage $m^2 \times m^2$ crossbar.

Second-Stage PGM Schedulers

The first stage schedulers (as described further herein with reference ti FIG. 4, component s 410, 411, 412, 413) are just TDM crossbars. The core of a PGM architecture is its second-stage scheduler(s). A conventional scheduler of a crossbar requires $V^2$ virtual output queue (VOQ) counters, where V is the size of the switch. In the implementation of system 300, the operation of the schedulers (e.g., any of Sch_1) in the first stage is straightforward. The function of a Sch_1 scheduler is to distribute the request tokens evenly to the second stage schedulers (e.g., any of respective Sch_2) and to relay grant tokens returned from the second stage schedulers back to the port processors associated with the Sch_1 scheduler. Such operation can be performed utilizing just two TDM crossbars, a first TDM crossbar for distributing requests and a second TDM crossbar for relaying grants. Such operation results in a port only being able to perform either of dispatch a request token to, or receive a grant token from, a second stage scheduler in any given frame. However, owing to there being a plurality m schedulers (e.g., M0-2 to M3-2) in the second stage operating in parallel, a port processor associated with a line card can process up to m request tokens and/or grant tokens for any destination port within one frame of operation.

Figure 4:
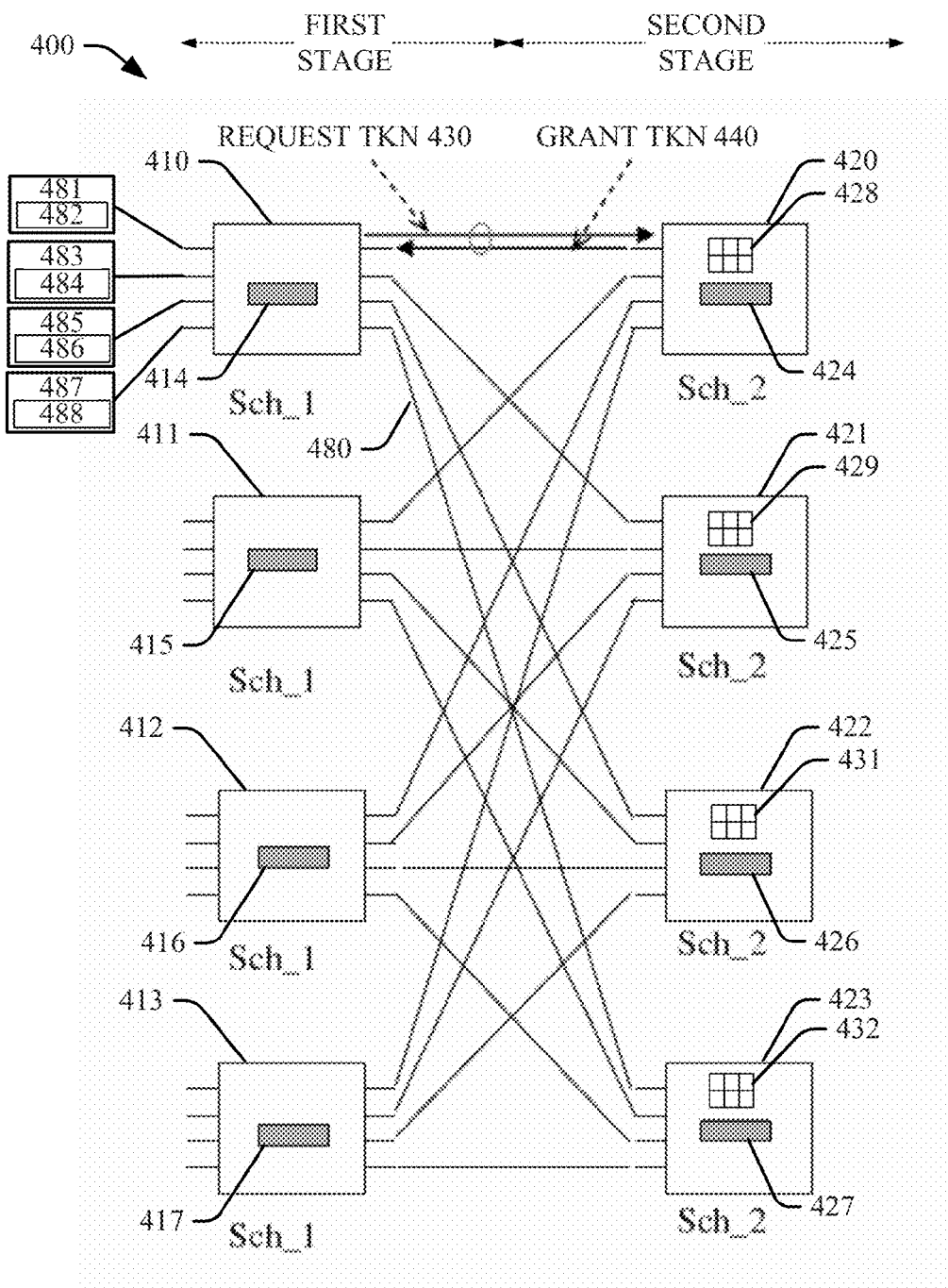
FIG. 4 is a block diagram illustrating an exemplary, non-limiting embodiment of a centralized implementation, in which both phases of the scheduling algorithm are executed in the second stage and the schedulers of the first stage is reduced to two TDM crossbars for sending request and grant tokens. In the distributed implementation, the first phase is executed by the second-stage schedulers and the second phase is executed by the first-phase schedulers.

With reference to FIG. 3, the function of the third stage scheduler can be incorporated into the function of a first stage scheduler illustrated in FIG. 4. Note that as in FIG. 3, the respective schedulers can be integrated into their corresponding data-path crossbars. For example, any of first stage schedulers (410-413, Sch_1) integrated with Mx-1 or second stage schedulers (420-423, Sch_2) integrated with Mx-2.

In FIG. 4, any of the links between a crossbar switch in one stage and crossbar switch in another are utilized to carry request tokens and grant tokens (as presented in FIG. 14). Hence, any link, e.g., link 480 is identified, can be utilized to convey a request token 430 between a first stage crossbar switch (e.g., switch 410) and a second stage crossbar switch (e.g., switch 420). Similarly, a link can be utilized to transport a grant token 440 between a second stage crossbar switch (e.g., switch 420) and a first stage crossbar switch (e.g., switch 410). Further, to facilitate understanding of various concepts herein, a plurality of line cards 481, 483, 485 and 487 are shown interfacing with switch 410, while each line card has a port processor 482, 484, 486, and 488 respectively associated therewith. Further, each switch 411-413 comprising the first stage has an associated scheduling processor 414-417 and each switch 420-423 comprising the second stage has an associated scheduler component 424-427 and counter component 428, 429, 431, and 432.

An exemplary, non-limiting operation of a second-stage scheduler depicted in FIG. 4 is further described. As part of a VOQ implementation, the number of request tokens for each input/output (ij) combination is recorded in a separate VOQ counter which can reside in a scheduler (e.g, within scheduler 420). Accordingly, a middle stage scheduler comprises $m^4$ ($=m^2 \times m^2$) VOQ counters.

VOQ counters $c_{ij}$: $c_{ij}$ records the total number of request tokens from input port i to output port j, $1 \leq i,j \leq m^2$ In addition, a second-stage scheduler also constructs the following bit maps from the VOQ counters.

Group VOQ counters $d_{ij}$: $d_{ij}$ records the total request tokens from input port group i to output port group j, $1 \leq i,j \leq m$ Port-request bit map [$r_{ij}$]: $r_{ij}=1$ if $c_{ij}>0$, $r_{ij}=0$ if $c_{ij}=0$ Group-request bit map [$s_{ij}$]: $s_{ij}=1$ if $d_{ij}>0$, $s_{ij}=0$ if $d_{ij}=0$ An exemplary, non-limiting embodiment for a middle stage scheduler is illustrated in FIGS. 5A, 5B, and 5C. FIGS. 5A, 5B, and 5C depict an exemplary, non-limiting embodiment as further described below, where 5A depicts a high level view of a Port request bit map array 510 comprising $m^2$ blocks, which in this embodiment m=4, and labeled $B_{00}$-$B_{33}$. FIG. 5B depicts the $m^2$ block array further broken down into blocks comprising m×m inputs and outputs for each block $B_{00}$-$B_{33}$, where exemplary counter bit $r_{12}$ is identified. Further, FIG. 5C depicts a Group request bit map block 520 comprising a plurality of counter bits, either in a 'nonzero' state (darkened) or a 'zero' state.

The scheduling operation is performed on a frame by frame basis. For each slot in a frame, scheduling comprises of two phases:

Phase 1: A matching algorithm uses [$s_{ij}$] to perform group matching, for example, to establish up to m connections between input groups and output groups (i.e. between a first-stage and a third-stage crossbar). The complexity of a matching algorithm to perform Phase 1 is much lower than that required for a single-stage crossbar because the size of a group to be matched by matching algorithm is only m×m, compared with a $m^2 \times m^2$ group as utilized in a conventional switch, such as using Benes topology for example.

Phase 2: The matching algorithm uses [$r_{ij}$] to perform member selection: selecting m input ports and m output ports to use the connection established during Phase 1. In an exemplary scenario, a connection is set up for input group i and output group j during Phase 1. Then any nonzero element in the block $B_{ij}$ (e.g., block $B_{00}$) can be selected to use this connection, where $B_{ij}$ is a subset of [$r_{ij}$] that consists of all request bits from input group i to output group j. Continuing the exemplary scenario, bit $r_{fg}$ of $B_{ij}$ (e.g., bit $r_{12}$ of $B_{00}$) is selected to use the connection. Such selection results in input f and output g not being able to be selected again within the same frame. This leads to the entire row f and the entire column g in [$r_{ij}$] to be blocked during the remaining slots of the current frame.

At the end of Phase 2, a grant token carrying (i) the destination port address and (ii) the slot number during which the matching is performed will be sent back by the scheduler to the selected input port.

Fairness

A concern when designing switching systems is the provision of short-term fairness in responding equally to requests (e.g., FIG. 4, request token 430) pertaining to input ports (or output ports) even where fairness can be maintained over the long-term.

As previously mentioned, $B_{ij}$ (e.g., any subblock $B_{ij}$) contains $m^2$ elements. Each row in subblock $B_{ij}$ represents an input port and each column in subblock $B_{ij}$ represents an output port. Hence, with a system comprising m=4 switches subblock $B_{ij}$ comprises $m^2$=16. Simply selecting an element from $B_{ij}$ in a row by row manner (or column by column manner) does not provide the required short-term fairness for input ports (or output ports), although long-term fairness can be maintained. To address this issue, a two-dimensional round-robin scheme can be utilized, as described further below.

Figure 6A:
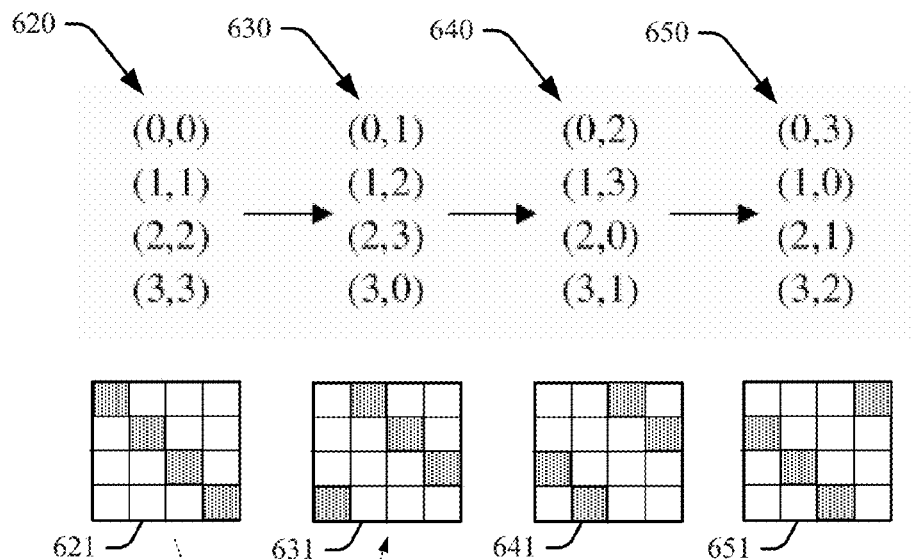
FIG. 6A is a representation illustrating an exemplary, non-limiting embodiment of a 2-D round robin selecting sequence.
Figure 6B:
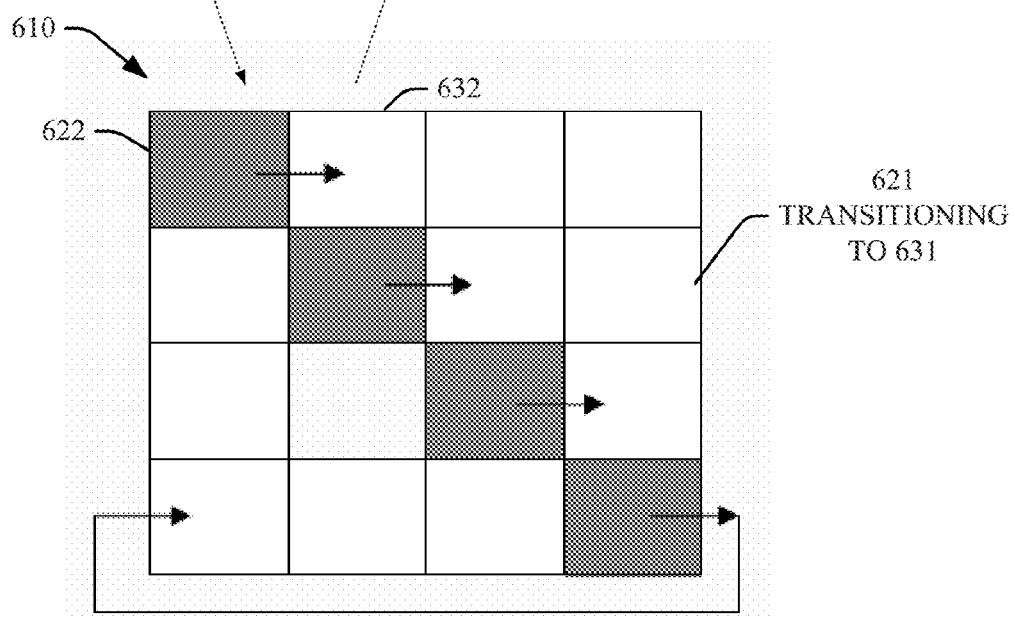
FIG. 6B is a block diagram illustrating an exemplary, non-limiting embodiment of a 2-D round robin selecting scheme.

In an exemplary, non-limiting embodiment, as illustrated in FIGS. 6A and 6B, elements comprising a block can be further divided into frames. The total $m^2$ elements in $B_{ij}$ (e.g., elements comprising block 610) can be divided into m segments 620, 630, 640, and 650 (also referred to as frames) where each segment comprises m elements. For example the first segment 620 comprises elements (0,0), (1,1), (2,2), (3,3), which as depicted in both FIGS. 6A and 6B, the first segment 620 and 621 only comprises the diagonal elements of $B_{ij}$. If one element is selected from segment 620 from top to bottom, each input and each output (e.g., each row and column comprising 610) will only be selected once in m slots. Left shifting the elements of first segment 620 leads to the second segment 630. By repeating the left-shifting operation (m−1) times (e.g., to advance through each of segments 620→630→640→650) each and every segment comprising all of the m segments of $B_{ij}$ are selected. Selecting an element in $B_{ij}$ is performed in a sequential segment by segment manner and within each segment, with the selection being performed in a top to bottom manner. The approach is in effect is a two-dimensional round-robin approach and can maintain short term fairness in selecting a VOQ counter for using a connection established during the first phase of the scheduling.

Selecting Grants

In one TDM frame, a port processor can receive up to m grant tokens (e.g., FIG. 4, grant token 440) for the same destination (e.g., a port on a third stage switch) from a plurality of different schedulers. A port processor has to determine the order in which the grant tokens are serviced to ensure that cells arrive at the output port in order. Assume that the member field address of a destination port address is k, where 0≤k≤m−1. By virtue of the topology of the Benes-Clos network (as previously described with reference to FIG. 3) and the round robin scheme used by the data TDM crossbars (as illustrated in FIG. 6), cells/data packets destined for output address k from the m middle-stage switches will be in accordance with the sequence presented in Equation 2:

$$k, (k-1) \bmod m, (k-2) \bmod m, \ldots, (k+1) \bmod m \quad (2)$$

Each number above represents the crossbar number in the middle stage. The selection of grant tokens with destination k issued by different middle stage schedulers is to follow the order of Equation 3 below.

Data-Path Crossbar Design

In an exemplary, non-limiting embodiment, a grant token (e.g., grant token 440) can include (a) the destination port address and (b) the slot number during which the matching is performed. Suppose a grant token with (destination=j, slot number=α) is sent to input port i by a middle-stage scheduler (e.g., scheduler 424). This means that this data cell should arrive at the corresponding middle-stage switch in slot α of the coming frame. However, due to the connection pattern of a round-robin crossbar, input i and output j may not be connected to the second-stage switch during slot α of the next frame. The lack of concurrent connection can give rise to a problem of time slot mismatch.

Figure 7A:
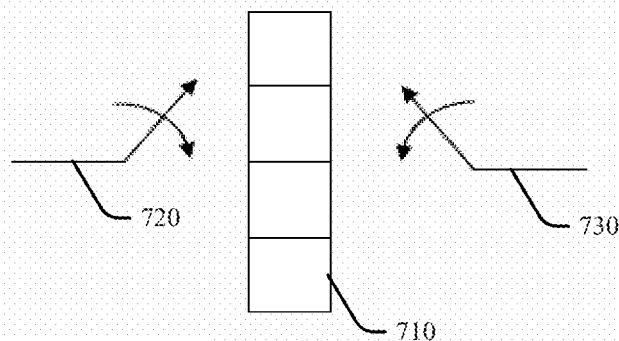
FIG. 7A is a block diagram illustrating an exemplary, non-limiting embodiment relating to a time slot interchange (TSI).
Figure 7B:
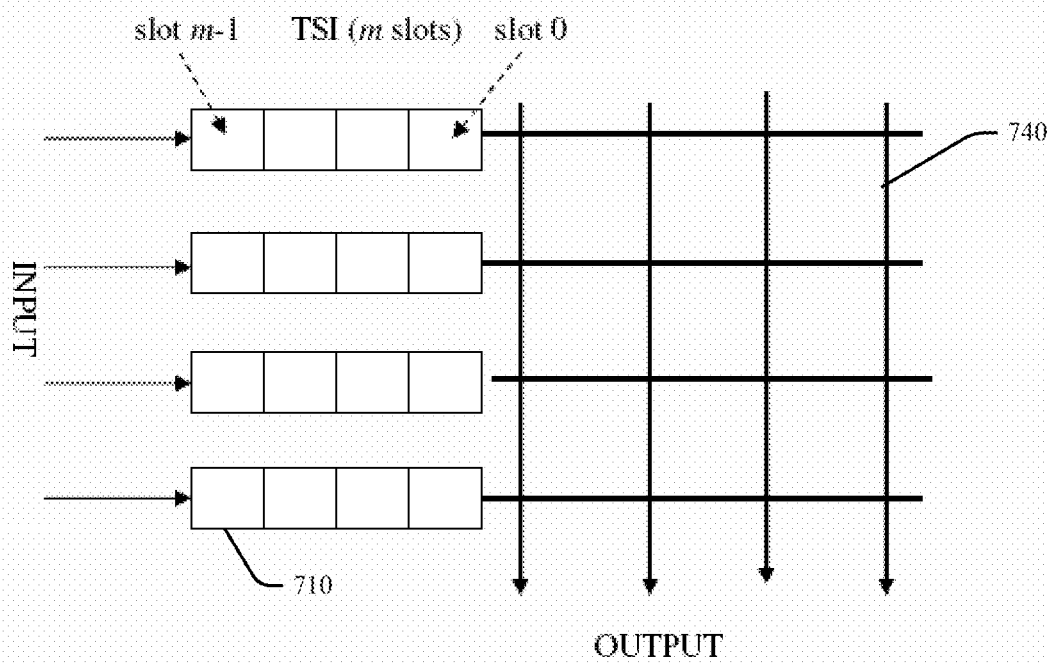
FIG. 7B is a block diagram illustrating an exemplary, non-limiting embodiment relating to a time slot interchange (TSI) added to a link of a crossbar.

As shown in the exemplary, non-limiting embodiments illustrated in FIGS. 7A and 7B, a time slot mismatch can be addressed with a time slot interchange (TSI) with m memory slots 710 (m is the RR frame size as previously discussed with reference to FIGS. 6A and 6B) is added to each input link of a second-stage switch (e.g., any switch Mx-2 illustrated in FIG. 3 and switches comprising the second stage in system 400). A TSI is a two-port (e.g., 720 and 730) memory device that can support read and write operations simultaneously. The various exemplary, non-limiting embodiments herein can support random write and sequential read operations. An incoming cell (e.g., received on 720 or 730) associated with crossbar 740 includes a slot number inside the grant. TSI control hardware will write the cell into the corresponding slot. It will then be read out during the same slot of the incoming frame. It is to be appreciated that the speed of the TSI is the same as the link speed, while the speed of the memory used in a shared-memory switch is m times the link speed.

In another, exemplary, non-limiting embodiment, another TSI can be added to each link of a third-stage data crossbar. As mentioned previously, all second-stage schedulers work independently and the scheduled cells will not collide at the destination. This is because each middle-stage scheduler can issue to an input port only one grant destined for a particular output port in a frame. In total, there can be, at most, m such grants issued to an input port by the m middle-stage schedulers. The m corresponding data cells will arrive from m different middle-stage switches. But based on the round-robin pattern, the destination output can only be connected to a middle-stage switch in a specific slot. This slot may be different from the slot carried by the grant token. This is again a slot mismatched problem. By adding a TSI to each link of a third-stage switch, the problem of time slot mismatch is solved.

Figure 8A:
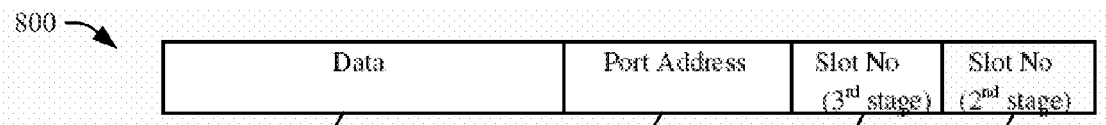
FIG. 8A is a block diagram illustrating an exemplary, non-limiting embodiment relating to format of a data packet or cell.

The TSI slot number for the third stage can be computed as follows, Equation 3:

$$(k-1) \bmod m \qquad (3)$$

where l is the middle-stage switch that sends back the grant token, and k is the member field of the destination address. With TSIs added to the data crossbars, all second stage schedulers can operate independently and in parallel, with destination collisions no longer being a concern. As illustrated in an exemplary, non-limiting embodiment illustrated in FIG. 8A, a data packet or cell can comprise of the following format and components: data 810, a port address 820, a third stage slot number 830, and a second stage (or middle stage) slot number 840. As shown in FIG. 8A, the two TSI slot numbers 830 and 840 are carried in the cell header.

Figure 8B:
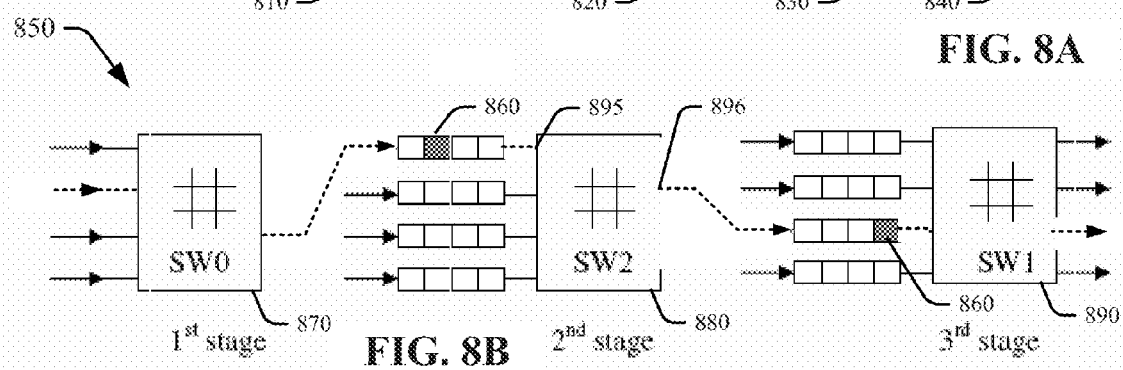
FIG. 8B is a block diagram illustrating an exemplary, non-limiting embodiment relating to matching of data packet time slots.

An exemplary, non-limiting embodiment for time slot matching is illustrated in FIG. 8B. As shown, a data packet 860 is conveyed through the switching system 850 which is a 16×16 switch with frame size=4. The input ports and output ports are numbered from 0 to 15. The input port of the data packet is 1 and output port is 2. The grant signal for this packet is sent by switch 2 of the second stage (switch 880). Further, The scheduler at the second stage matches input port 1 (895) with output port 2 (896) for conveyance of data packet 860, and the slot number during which the matching was performed is 2. Therefore the slot number field 880 in FIG. 8A will be set to 2. The slot number for the third stage (i.e. filed 830) will be computed with Eq. 3. In this case k=2,l=2. Thus the slot number=0.

Figure 9:
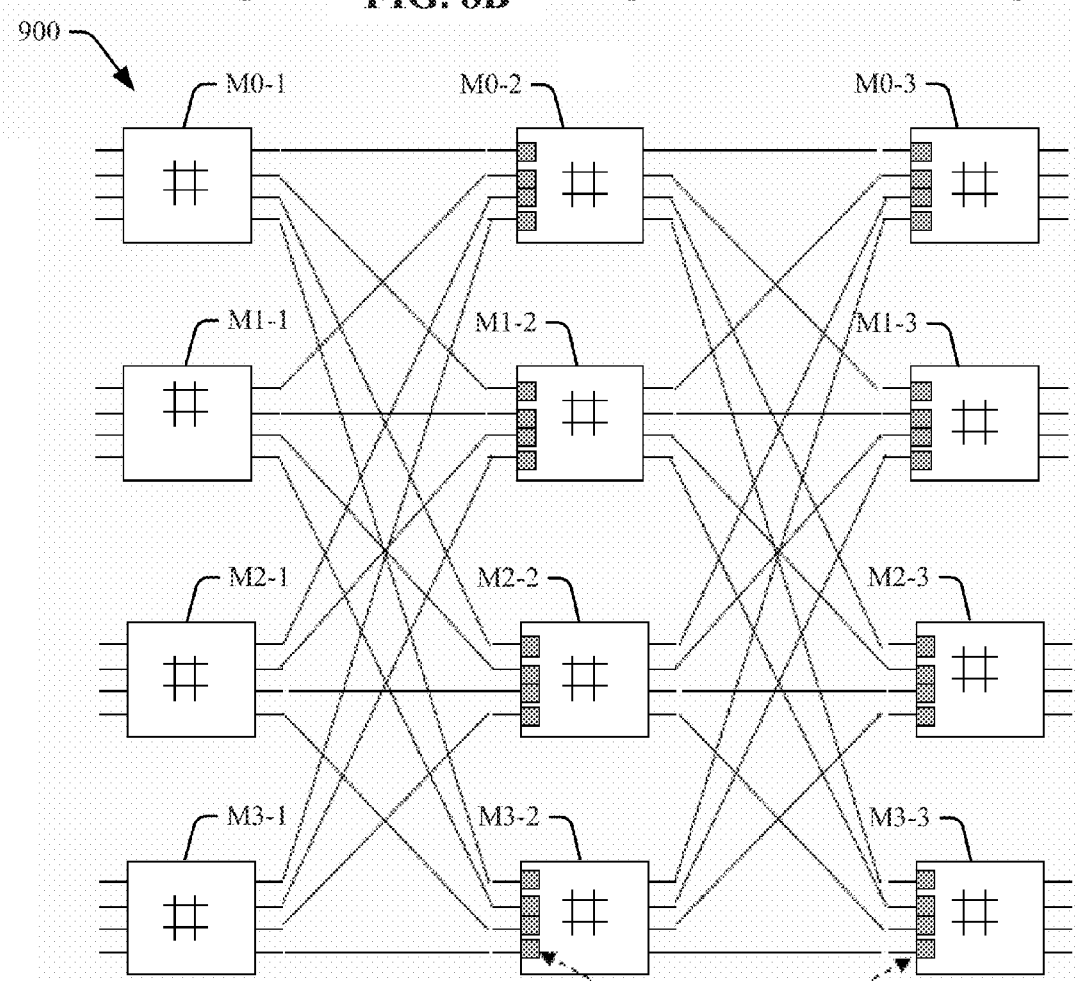
FIG. 9 is a block diagram illustrating an exemplary, non-limiting embodiment of distribution of TSI buffers (with m slots) attached to each input of second and third stage crossbar switches.

FIG. 9 illustrates system 900, an exemplary, non-limiting embodiment of a crossbar switching system. As illustrated, the plurality of switches are labeled according to the same schema as utilized in FIG. 3 of Mx-y, and reference should be made to FIG. 3 for further understanding of the schema. In accordance with the various concepts presented herein with regard to the concept of TSI, FIG. 9 depicts the second stage switches Mx-2 and the third stage switches Mx-3 having a TSI buffer(s) 950 respectively associated therewith.

Port Processor

Figure 10:
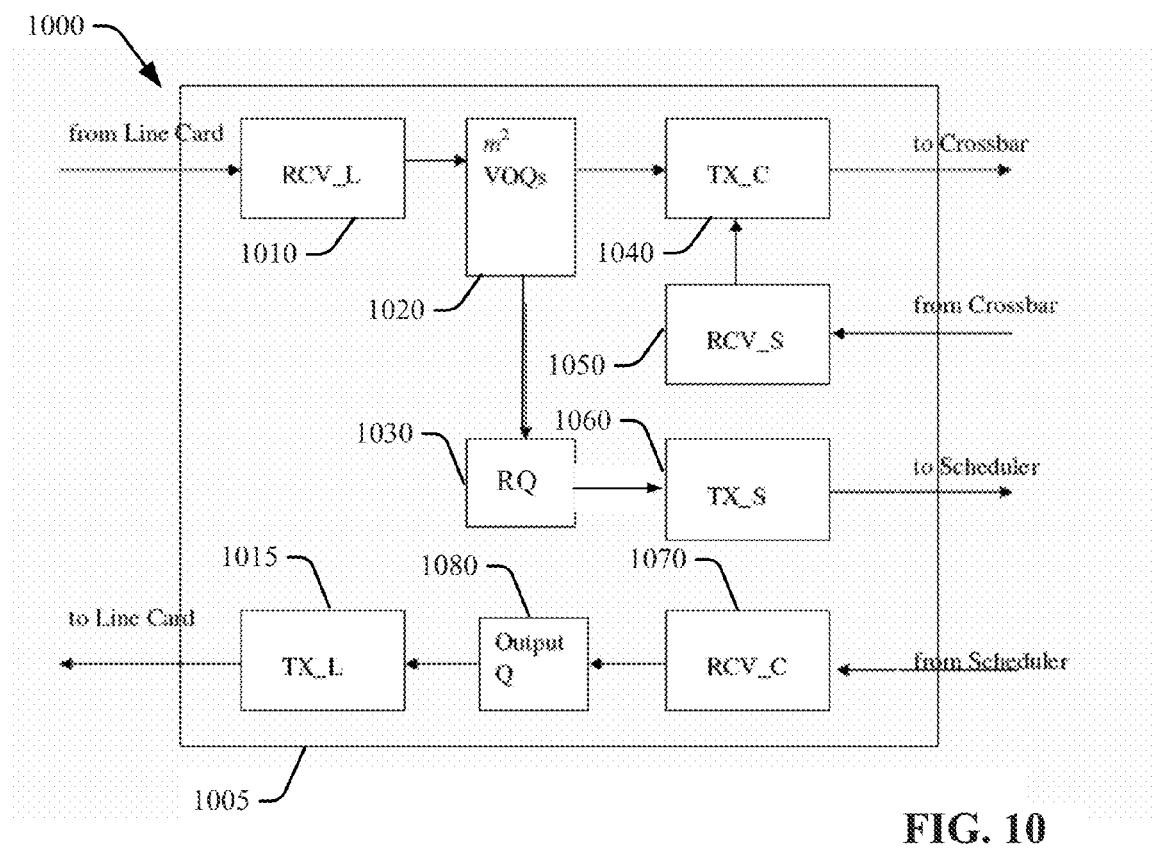
FIG. 10 is a block diagram illustrating an exemplary, non-limiting embodiment relating to configuration of a port processor.

FIG. 10 illustrates an exemplary, non-limiting embodiment of a port processor. A port processor 1005 receives (at receiver 1010) a data packet from line card and sends a request token to a first-stage scheduler in FIG. 4. The packet is stored in a virtual output queue (VOQ) of 1020 which comprises m² queues. A data packet can be transferred to a crossbar switch (not shown) (e.g., any of first stage switches Mx-1) via transmitter 1040. And a data packet can be received at the port processor 1005 from a crossbar switch at receiver 1070. It is processed by the output queue component 1080 for transmission to the line card. In response to the data packet being received at the port processor 1005, a request token is generated and put into the request queue (RQ) component 1030. Request tokens can be forwarded from port processor 1005 to the scheduler via transmitter 1060. Grant tokens are received at the port processor 1005 via receiver 1050. The data packet can be forwarded to the destination identified in the request grant.

Methodologies

Figure 11:
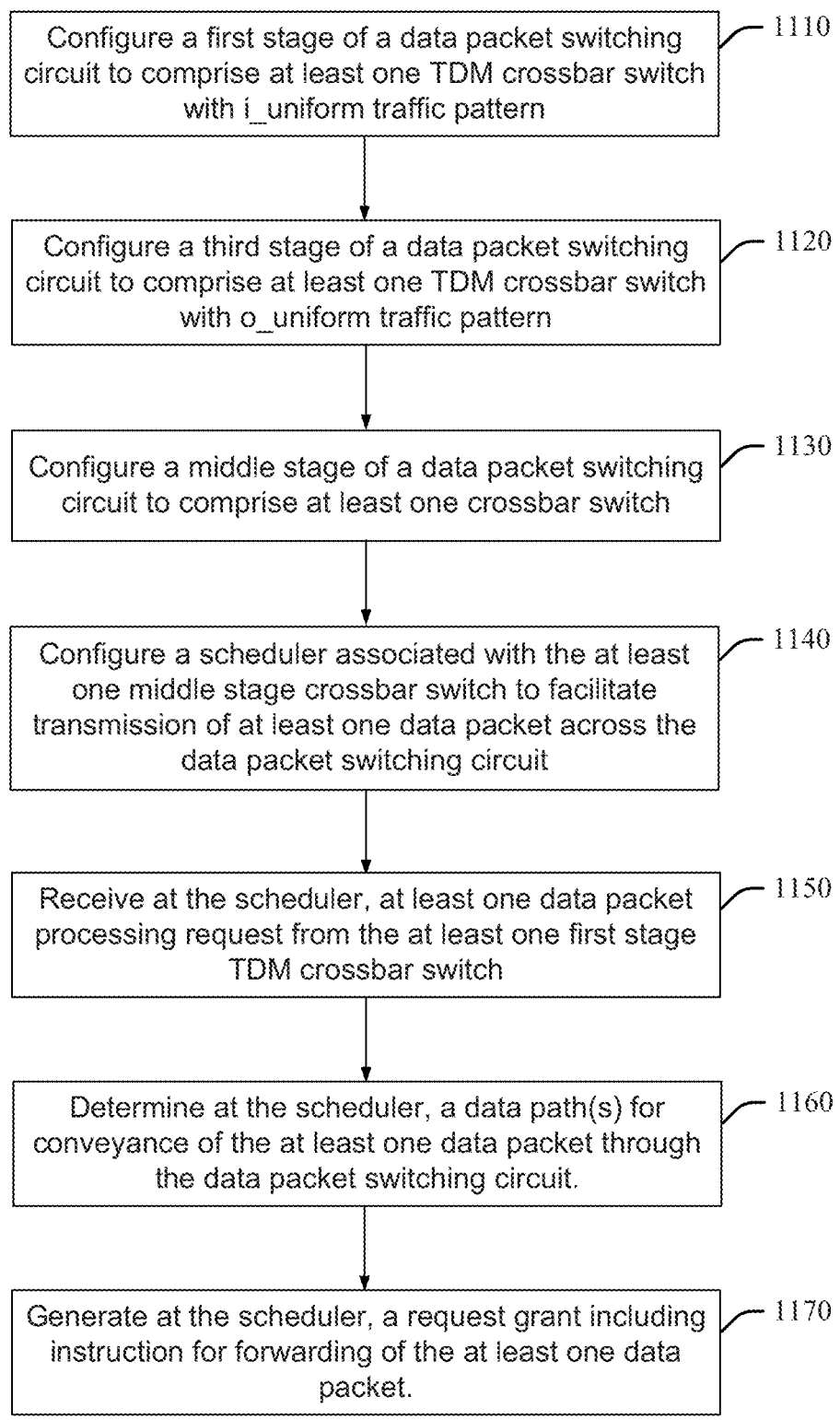
FIG. 11 is a flow diagram illustrating an exemplary, non-limiting embodiment for construction of a three stage switching circuit.

FIG. 11 presents a flow diagram illustrating an exemplary, non-limiting embodiment to facilitate configuration of a three stage switching circuit for routing of a plurality of data packets. At 1110, a first stage of the three stage switching circuit is defined, wherein one or more switches are configured to be a time division multiplexing (TDM) crossbar (e.g., any of switches Mx-1 illustrated in FIG. 3). As mentioned previously, owing to the one or more switches can be configured as o_uniform owing to the traffic pattern of a switch in the first stage is from an input port being evenly spread across all the output ports (per FIG. 15).

At 1120, a third stage of the three stage switching circuit is defined, wherein one or more switches are configured to be a time division multiplexing (TDM) crossbar (e.g., any of switches Mx-3 illustrated in FIG. 3). As mentioned previously, owing to the one or more switches can be configured as i_uniform owing to the traffic pattern of a switch in the third stage for an output port is uniformly spread among all of the input ports (per FIG. 2).

At 1130, a middle stage (or second stage) of the three stage switching circuit is defined, wherein the middle stage comprises one or more switches (e.g., any of switches Mx-2 illustrated in FIG. 3) which are located to receive data packets and requests from one or more switches comprising the first stage, forward the data packets to the one or more switches comprising the third stage and transmit grants to the one or more switches in the first stage. The one or more switches in the middle stage are crossbar switches.

At 1140, a scheduler (e.g., FIG. 3, scheduler 320) associated with the one or more middle stage switches is configured to facilitate transmission of the data packets through the switching circuit.

At 1150, in an embodiment, the scheduler can receive requests (e.g., 1490) for processing from one or more first stage switches.

At 1160, determine a processing schedule and data path for processing of the data packet associated with the request(s).

At 1170, based on a determined processing schedule (and data path) for conveyance of the data packets, generate request grants (e.g., 1495) to comprising instruction for one or more first stage switches to forward packet data across the three stage switching circuit.

Figure 12:
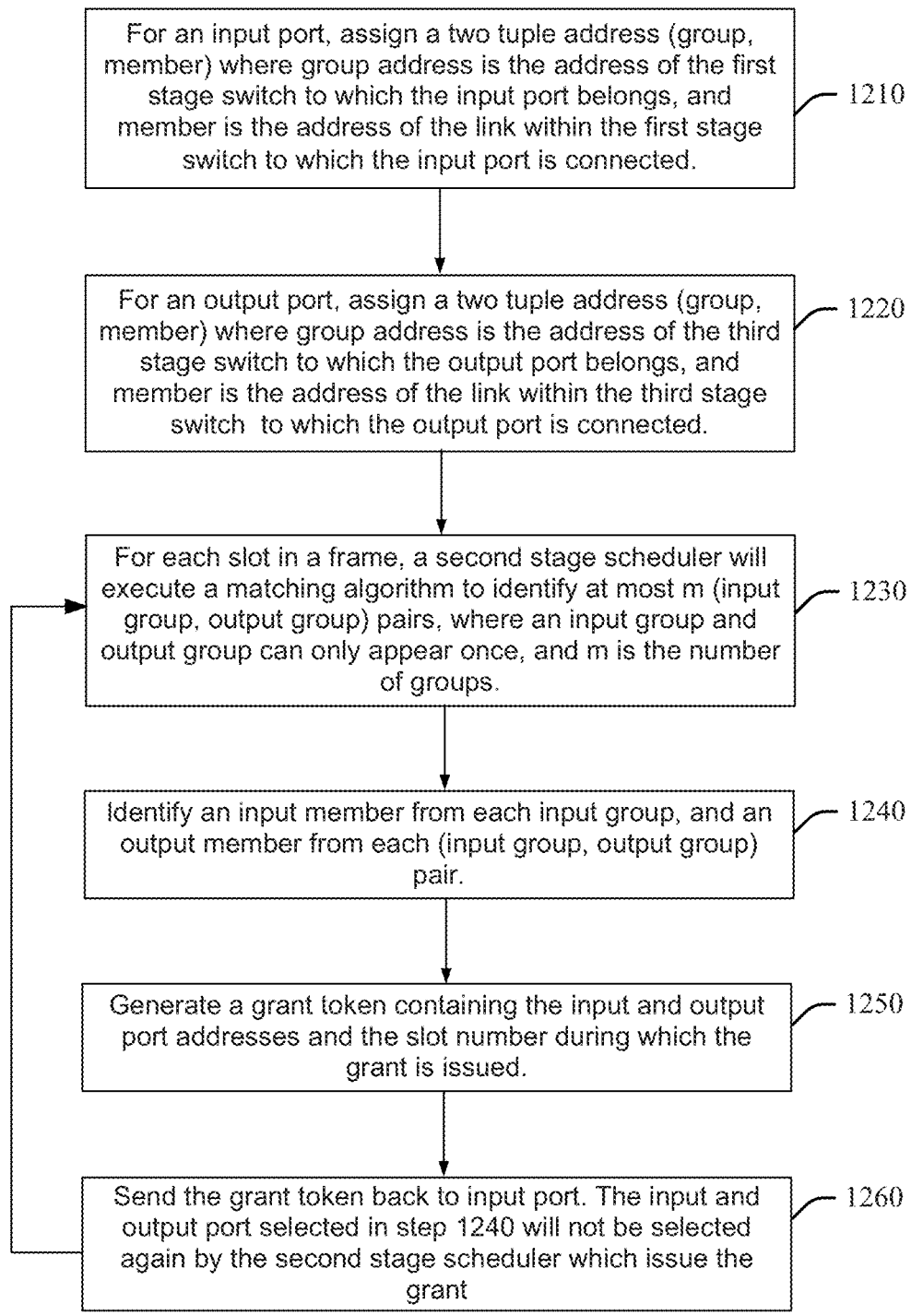
FIG. 12 is a flow diagram illustrating an exemplary, non-limiting embodiment for generation of port and switch identifiers.
Figure 13:
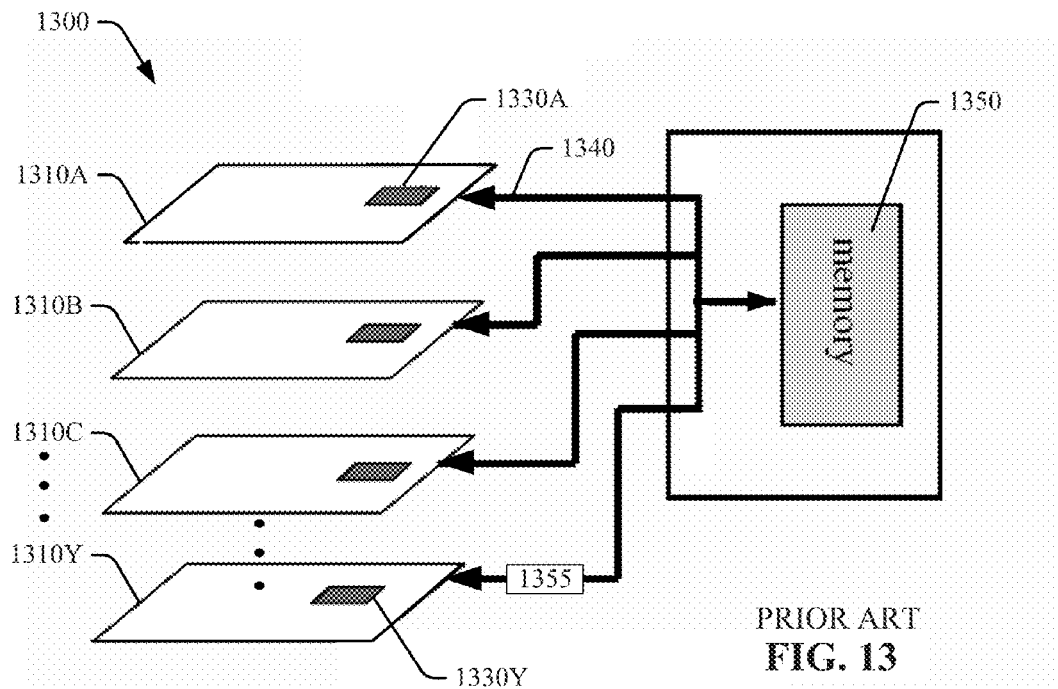
FIG. 13 is a block diagram illustrating a single switch circuit.

FIG. 12 presents a flow diagram illustrating an exemplary, non-limiting embodiment to facilitate configuration of a three stage switching circuit for routing of a plurality of data packets. At 1210, for a given input port, a two tuple address (group, member) is assigned. The group address (e.g., FIG. 3, group address) is the address of the first stage switch (e.g., any of Mx-1) to which the input port belongs, and member (e.g., FIG. 3, member address) is the address of the link within the first stage switch to which the input port is connected.

At 1220, for a given output port, a two tuple address (group, member) is assigned. The group address is the address of the third stage switch (e.g., any of Mx-3) to which the output port belongs, and the member is the address of the link within the third stage switch to which the output port is connected.

At 1230, for each slot (e.g., slots 710) in a frame, a second stage scheduler (e.g., any scheduler associated with Mx-2) will execute a matching algorithm to identify at most m (input group, output group) pairs, where an input group and output group can only appear once, and m is the number of groups.

At 1240, an input member from each input group is identified, and an output member from each (input group, output group) pair is also identified.

At 1250, a grant token is generated comprising the input and output port addresses and the slot number during which the grant is issued.

At 1260, the grant token is sent to the input port. As mentioned, the input and output port selected in step 1240 will not be selected again by the second stage scheduler which issued the grant until the beginning of the next frame. Flow returns to 1230 for identification of another input group, output group pairing.

In addition, it should be appreciated that while the methodologies provided above are shown and described as a series of acts for purposes of simplicity, such methodologies are not limited by the order of acts, as some acts can, in accordance with one or more aspects, occur in different orders and/or concurrently with other acts from that shown and described herein. For example, those skilled in the art will understand and appreciate that a methodologies could alternatively be represented as a series of interrelated states or events, such as in a state diagram. Moreover, not all illustrated acts may be required to implement a methodology in accordance with one or more aspects.

General Considerations

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

What is claimed is:

1. A system comprising a switching fabric for routing packets between multiple ports comprising:
   a first switching stage comprising a plurality of first stage crossbar switching devices, configured to receive a data packet and a request associated with the data packet from at least one input port and forward the data packet and the request, wherein the plurality of first stage crossbar switching devices comprises at least a first crossbar switching device, comprising a first time division multiplexing crossbar, and a first stage scheduler component configured to forward the request to a second switching stage;
   the second switching stage, comprising a plurality of second stage crossbar switching devices, configured to receive the data packet and the request from the first switching stage, forward the data packet, process the request, and generate a grant based on the request; and
   a third switching stage comprising a plurality of third stage crossbar switching devices, configured to receive the data packet from the second switching stage, wherein the plurality of third stage crossbar switching devices comprises at least a third crossbar switching device comprising a second time division multiplexing crossbar configured to forward the data packet to an output port.

2. The system of claim 1, wherein the first time division multiplexing crossbar is configured to adjust connection patterns in a periodic fashion.

3. The system of claim 1, wherein the plurality of second stage crossbar switching devices comprises at least a second crossbar switching device configured to forward the data packet to the third switching stage and a second stage scheduler component configured to receive the request from the first stage scheduler component and return the grant to the first stage scheduler component.

4. The system of claim 1, wherein the first stage scheduler component is configured to evenly distribute a plurality of requests between the plurality of second stage crossbar switching devices.

5. The system of claim 3, wherein the first crossbar switching device comprises a plurality of input ports, wherein the second stage scheduler component is further configured to select the at least one input port, of the plurality of input ports, to forward the data packet from the first switching stage to the second switching stage.

6. The system of claim 5, wherein the third crossbar switching device comprises a plurality of output ports including the output port, wherein the second stage scheduler component is further configured to select the output port to forward the data packet from the second switching stage to the third switching stage.

7. The system of claim 6, wherein the plurality of input ports are grouped together to form an input port group that has an input port group number of a number of input port groups.

8. The system of claim 7, wherein the plurality of output ports are grouped together to form an output port group that has an output port group number of a number of output port groups.

9. The system of claim 8, wherein the second stage scheduler component is configured to identify a number, m, pairs that correspond to combinations of the input port group and the output port group for a given slot in a frame, wherein the input port group number and the output port group number only appears once in the number, m, pairs, and wherein the number, m, is equal to the number of the input port groups or the number of the output port groups.

10. The system of claim 3, wherein the second stage scheduler component comprises at least one counter configured to record the request received at the second stage scheduler component, wherein the request further comprises a pairing of the at least one input port and the output port.

11. The system of claim 9, wherein, for the given slot in the frame, the second stage scheduler component is further configured to identify one input port from each of the number of input port groups to send data, and one output port from each of the number of output port groups to receive the data.

12. The system of claim 1, wherein the second time division multiplexing crossbar of the at least the third crossbar switching device comprises a third stage time-slot interchange buffer configured to move an incoming slot to another slot before forwarding the incoming slot to the second time division multiplexing crossbar.

13. The system of claim 3, wherein the second crossbar switching device comprises a second stage time slot interchange buffer configured to place the data packet in an appropriate slot before forwarding the appropriate slot to the second crossbar switching device.

14. A method for transporting a data packet in a switching network, comprising:
   identifying, by a scheduling component located at a second stage switch comprising a plurality of second stage crossbar switching devices, a first port at a first stage switch, comprising a first time division multiplexing crossbar, and a second port at a third stage switch, comprising a second time division multiplexing crossbar, wherein the first port and second port are available for transport of the data packet across the switching network;
   generating, by the scheduling component, two-tuple identifiers related to the first port, the first stage switch, the second port, and the third stage switch, wherein a first two-tuple identifier comprises a first identifier identifying a first stage switch group address and a first port member address, and wherein a second two-tuple identifier comprises a second identifier identifying a third stage switch group address and a second port member address;
   generating, by the scheduling component, a grant comprising the first two-tuple identifier and the second two-tuple identifier; and
   forwarding, by the scheduling component, the grant to the first stage switch; and
   identifying, at the first stage switch, a selection of switches and ports to utilize during conveying the data packet through the switching network.

15. A data packet switching network, comprising:
   a memory to store computer-executable instructions; and
   a processor located at a scheduling component of a second stage switch and communicatively coupled to the memory that facilitates execution of the computer-executable instructions to perform operations comprising:

identifying a first port at a first stage switch, comprising a first time division multiplexing crossbar switch, and a second port at a third stage switch, comprising a second time division multiplexing crossbar switch, wherein the first port and second port are available for transport of the data packet across the switching network;

generating two-tuple identifiers relating to the first port, the first stage switch, the second port, and the third stage switch, wherein a first two-tuple identifier comprises a first identifier identifying a first stage switch group address and a first port member address, and wherein a second two-tuple identifier comprises a second identifier identifying a third stage switch group address and a second port member address;

generating a processing grant comprising the first two-tuple identifier and the second two-tuple identifier;

forwarding the processing grant to the first stage switch; and identifying, at the first stage switch, a selection of switches and ports to utilize during conveying the data packet through the switching network.

16. The data packet switching network of claim 15, wherein the second stage switch comprises a crossbar switching device.

17. The data packet switching network of claim 15, wherein the scheduling component is configured to identify a number, m, pairs that correspond to combinations of an input port group associated with the first port and an output port group associated with the second port for a given slot in a frame, wherein an input port group number and an output port group number only appears once in the number, m, pairs, and wherein the number, m, is equal to a number of a plurality of input port groups or a number of a plurality of output port groups.

18. The data packet switching network of claim 17, wherein, for the given slot in the frame, the scheduling component is further configured to identify one input port from each of the plurality of input port groups to send data, and one output port from each of the plurality of output port groups to receive the data.

* * * * *